United States Patent [19]
Braitinger et al.

[11] Patent Number: 4,648,003
[45] Date of Patent: Mar. 3, 1987

[54] ELECTRICAL CIRCUIT ARRANGEMENT FOR THE PROTECTION OF PRESSES

[75] Inventors: Helmut Braitinger, Goeppingen; Günther Grupp, Eislingen, both of Fed. Rep. of Germany

[73] Assignee: L. Schuler GmbH, Fed. Rep. of Germany

[21] Appl. No.: 696,709

[22] Filed: Jan. 31, 1985

[30] Foreign Application Priority Data

Feb. 8, 1984 [DE] Fed. Rep. of Germany ....... 3404359

[51] Int. Cl.$^4$ .......................................... H02H 7/093
[52] U.S. Cl. ..................................... 361/31; 318/317; 318/318; 318/327
[58] Field of Search ....................... 361/23, 30, 31, 33; 318/317, 318, 327, 563

[56] References Cited

U.S. PATENT DOCUMENTS

| | | | |
|---|---|---|---|
| 3,790,874 | 2/1974 | Klimo | 361/30 |
| 3,931,557 | 1/1976 | Osborn | 361/23 X |
| 3,978,381 | 8/1976 | Yamamoto et al. | 361/33 X |
| 4,370,690 | 1/1983 | Baker | 361/23 |
| 4,413,213 | 11/1983 | Baumgarten, Jr. | 361/30 |

FOREIGN PATENT DOCUMENTS

| | | |
|---|---|---|
| 2013272 | 10/1971 | Fed. Rep. of Germany . |
| 2624784 | 12/1976 | Fed. Rep. of Germany . |
| 1563709 | 1/1979 | Fed. Rep. of Germany . |

Primary Examiner—A. D. Pellinen
Assistant Examiner—Jeffrey A. Gaffin
Attorney, Agent, or Firm—Barnes & Thornburg

[57] ABSTRACT

A protective circuit arrangement of a motor control for the starting and operation of a motor of a press with a power stage, a current-regulating element and a rotational speed regulating element. Comparator stages are connected to the inputs of the regulating elements for forming the guide magnitudes from the actual current value and the desired current value as well as from the actual rotational speed value and the desired rotational speed value. For suppressing the disconnect signal during the starting phase of the motor, the circuit additionally includes a rotational speed comparator stage, a desired current value memory and a current comparator stage. The desired current value, which stored after the starting phase in the desired current value memory, is compared with the current value in the current comparator stage to produce a motor current interrupt signal in case of an overload current that might lead to a press damage. As a result thereof, the damage is limited to the part responsible for the increased motor current.

7 Claims, 2 Drawing Figures

ELECTRICAL CIRCUIT ARRANGEMENT FOR THE PROTECTION OF PRESSES

BACKGROUND AND SUMMARY OF THE INVENTION

The present invention relates to an electrical circuit arrangement for the protection of presses, in which the current input of the driving motor is proportional or nearly proportional to the torque or moment of load, especially for the protection of high-speed presses with a power control stage, a current-regulating member, a rotational speed regulating member, a device for the continuous detection of a magnitude proportional to the actual value of the torque or moment of load and a device for the continuous detection of a magnitude proportional to the actual value of the rotational speed as well as pre-setting device for presetting or predetermining the magnitude corresponding to the desired rotational speed value.

The current carried by the driving motor during the starting phase of the press is larger than the current carried during normal operation by a multiple, owing to the need of overcoming inertia moments of the load coupled to the motor, such as flywheel, slide carriages and the like and static friction in the bearings and slide guidances. With rapidly operating presses, for example, automated punching or stamping machines for sheet metal parts of electric motors, the predominant proportion of the output produced by the driving motor is absorbed by the friction in bearing- and guide-elements so that a nearly constant power output of the driving motor and consequently also a nearly constant power or current input will establish itself during the operation. During the operation, the press or at least parts thereof may be destroyed, for example, by bearing damages or by movement in collision position, which may lead to an increased current carried by the motor, over and above the operating current.

A motor protection circuit is disclosed in the DE-OS No. 26 24 784 with a circuit for determining the motor current input, with a circuit for turning off the motor in case of an excessive current input, and with a circuit for bypassing the starting phase of the motor. The bypass circuit includes a timing element consisting of an RC-member which is connected to the output voltage of the motor current input circuit by way of a transistor or Zener diode circuit and which keeps the voltage produced at the output of this circuit to a low level. After a lapse of time—discharge of the condenser of the timing element—the detection of a current which goes beyond the operating current, leads to a disconnection of the motor current circuit.

An installation for monitoring the motor current input which relates to the press operation and the protection of the motor, is described in the DE-OS No. 20 13 272, with an actual current value transmitter, a number of desired current value transmitters adjusted to certain angular ranges of the press and a comparator device for producing a warning or disconnecting signal always when the actual current value exceeds the desired current value of predetermined magnitude for the angular range of rotation. The selection of the respectively responding desired value transmitter and the time interval of the comparison takes place by way of a pulse producer. The circuit configuration of the DE-OS does not provide a disconnect bypass in the starting phase of the press motor.

The present invention starts with the circuit disclosed in the DE-OS No. 15 63 709. This publication discloses a rotational speed regulating installation for direct current shunt-wound motors with a power stage in the armature circuit and a power stage in the field regulating circuit. A tachometer device is coupled to the motor shaft to form a voltage proportional to the rotational speed of the motor. The voltage value is compared in a comparator element with the desired rotational speed value. The comparison result is present as guide magnitude at the input of a speed-regulating device. The current flowing in the armature circuit produces, by way of a current converter, an actual current value which is fed to a further comparator connected in the input of an armature current-regulating device operating on the power stage, which receives its second reference magnitude from the rotational speed regulating device.

The present invention is concerned with the task of further developing such a prior art circuit arrangement for disconnect purposes in presses in case of current input of the press driving motor going beyond the operating current input in order to limit the destructions occurring in the case of damage to the machine part bringing about the increased current input. For a continuous comparison between the actual value of the torque or moment of load, respectively, a magnitude (voltage) proportional thereto, with a preset value, the preset value is formed after reaching the desired rotational speed of the motor and is stored in a memory.

The underlying problems are solved according to the present invention in that the magnitudes for the desired rotational speed value and the actual rotational speed value are connected to a comparator stage in the input of the rotational speed regulating device and additionally are connected to a second comparator stage for producing a signal when the motor reaches the preset or predetermined desired rotational speed value. The magnitude for the actual value of the torque or moment of load is connected to a third comparator stage in the input of the current-regulating element and additionally to the input of a memory element and to a first input of a fourth comparator stage. The output of the memory element is connected to a further input of the fourth comparator stage for producing a signal in the output of the fourth comparator stage when the magnitude for the actual value of the torque or moment of load exceeds the memory content of the memory element. The output of the second comparator stage is connected to an enabling input of this memory element for enabling the memory element to store the actual value of the torque or moment of load for a continuous access to the memory content.

Such a circuit configuration is realizable in an advantageous manner by analog, digital or mixed circuits. The circuit arrangement of the present invention is not limited to monitoring direct current shunt-wound motors. Instead, the circuit arrangement of the present invention is applicable to all motors in which the motor current is at least nearly proportional to the torque or moment of load. The circuit arrangement according to the present invention is applicable in an advantageous manner to motors with high load changes, especially in high-speed presses. Further significant advantages result from the fact that the fading out of the starting operation of the motor together with the drive system, characterized by considerable mass which is coupled thereto, does not take place as a function of time after the engagement to the preselected operating rotational speed—the desired operating values are not always attained thereby—but instead on the basis of a pure rotational speed interrogation for the operating rotational speed.

For a proper operation with load changes of small number, the circuit arrangement may be constructed according to the present invention for attaining a necessary spacing between load current as a consequence of load peaks and of a disturbance magnitude to be controlled by connecting a current limiter in the input of the memory element and/or by connecting a current smoothing stage in the common line section to the input of the memory element and to the first input of the further comparator stage so that in an advantageous manner load peaks can also be detected at the instant of the formation of the desired current value, respectively, of a magnitude proportional thereto.

These and other objects, features and advantages of the present invention will become more apparent from the following description when taken in connection with the accompanying drawing which shows, for purposes of illustration only, one embodiment in accordance with the present invention, and wherein:

DETAILED DESCRIPTION OF THE DRAWINGS

Figure 1:
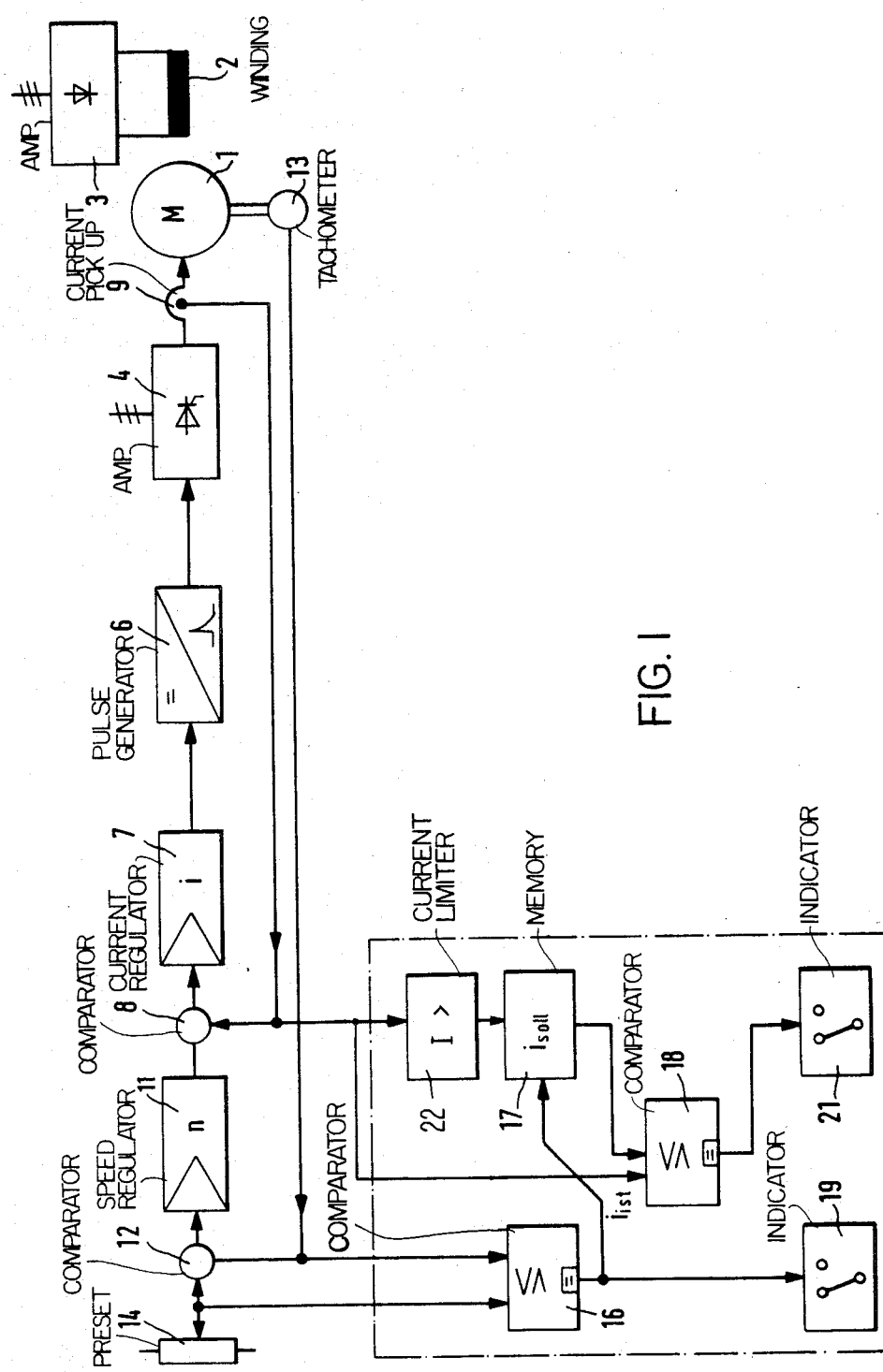
FIG. 1 is a schematic block diagram of a protective circuit arrangement in accordance with the present invention.

Referring now to FIG. 1 of the drawing, the driving motor 1, for example, a motor for the drive of a press ram, a shearing knife or similar loads may be a D.C. shunt-wound motor, as illustrated, whose exciting field windings 2 are connected to a separate power or output amplifier stage 3. However, any other motor may also be used for the circuit arrangement of the type to be described with a corresponding adaptation, for example, of the power or output stage 4 for the motor current, in this case, for the armature current, whose torque or moment of load represents a function of the current, whereby the current input thereof is proportional or at least approximately proportional to the load or the detected torque. A pulse producer 6, for example, a pulse generator, is connected to the input of the power or output stage 4, whose output signals influence, for example, the ignition angle of the thyristor or thyristors of the power or output stage 4. A current regulating element 7 is connected to the input of the pulse producer 6. The guide magnitude for the current-regulating element 7 is derived from a first comparator stage 8. This comparator stage 8 may be a summing amplifier. The actual current value determined by way of a current pick-up 9 and the value present in the output of a rotational speed regulating element 11 as desired value, are connected to the input of the first comparator stage 8.

The input of the rotational speed regulating element 11 is connected to the output of a third comparator stage 12. The rotational speed derived from a continuous detection device coupled to the motor, such as, the tachometer device 13, respectively, a magnitude proportional thereto and a desired rotational speed value formed in a presetting device 14 are fed to the inputs of the third comparator stage 12 for forming, in the output of the latter, the guide magnitude for the rotational speed regulating device 11. The circuit arrangement of this invention additionally includes a second rotational speed comparator stage 16, a memory element 17 and a fourth comparator stage 18. The second comparator stage 16 is connected with one of its inputs to the output of the desired rotational speed value presetting device 14 and with the other input thereof to the line coming from the tachometer device 13. The output of the second rotational speed comparator 16 is connected to a rotational speed limit value indicator 19 for producing an operating signal and to an enabling input of the memory element 17 for opening the signal input of this memory when the motor 1 reaches the desired rotational speed, i.e., when $n_{Ist\,(Actual)} = n_{Soll\,(Desired)}$. The output of the memory element 17 is connected to an input of the fourth comparator stage 18. The output signal of the current input pick-up device 9 is connected to a further input, i.e., the second input of this fourth comparator stage 18.

Figure 2:
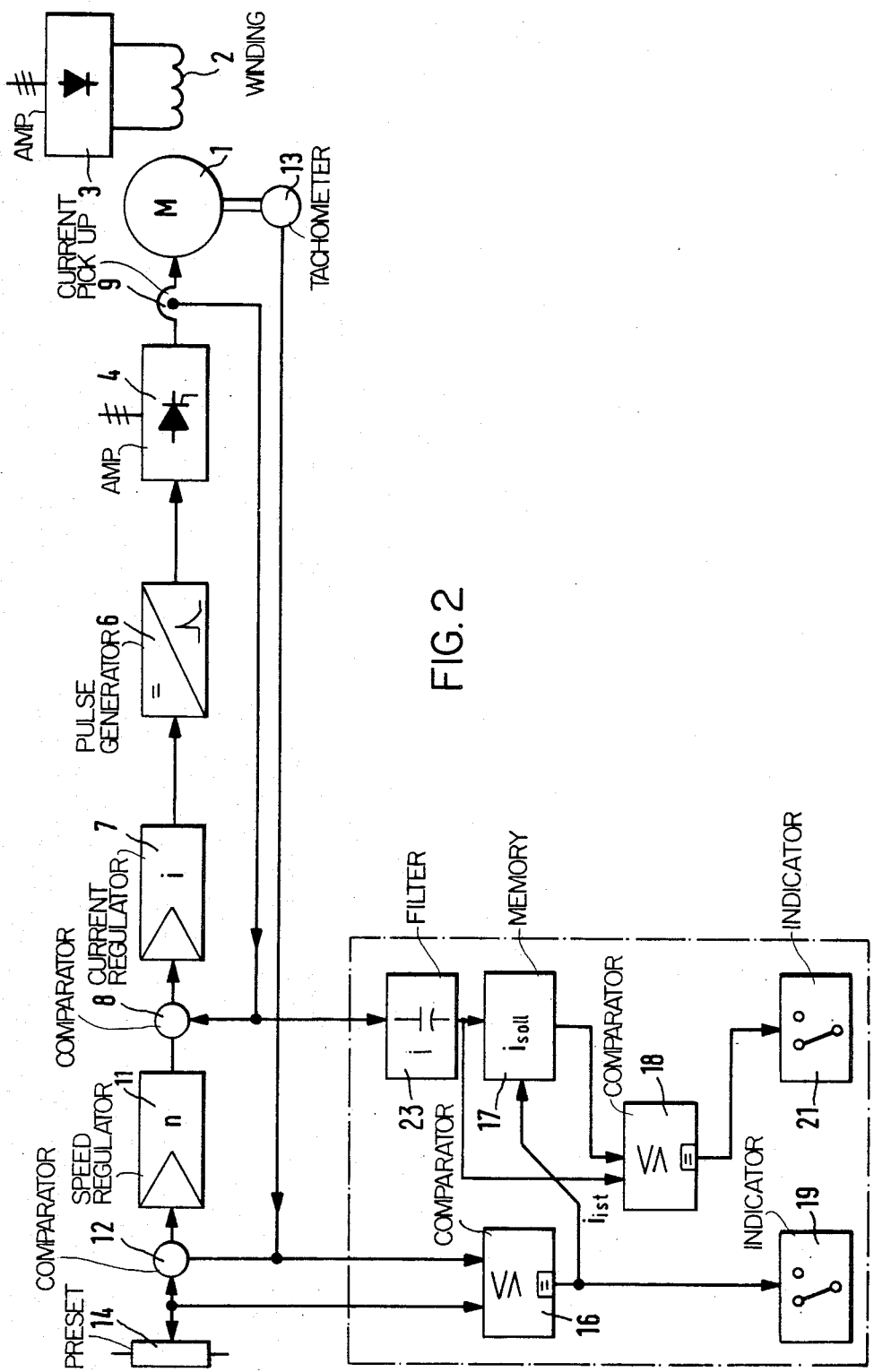
FIG. 2 is a schematic block diagram of another circuit arrangement in accordance with the present invention.

The output of the fourth comparator 18 leads to a current limit value indicator 21 for producing a disconnect or warning signal to the press monitoring system when $I_{Ist\,(Actual)}$ is larger than $I_{Soll\,(Desired)}$. The rotational speed limit value indicator 19 basically sets the output of the current limit value indicator 21 to open. The latter is closed as a consequence of the current comparison in the fourth comparator stage 18 when the actual current is larger than the desired current in the memory 17. A current smoothing element or filter 23 may be connected in the common line to the memory 17 and to the fourth comparator stage 17 as illustrated in FIG. 2, or as illustrated in FIG. 1, a current limiting member 22 may be connected in the input of the memory element 17 to avoid storing the comparison magnitude of an overload current directly after the starting phase of the motor 1 as a consequence of an overload which then occurs. The values obtained in the current pick-up 9 and in the tachometer device 13 represent magnitudes (voltages) proportional to the original magnitudes which can be converted by way of analog/digital converters for a digital circuit configuraton. The comparator stages 8 and 12 can be constructed as summing amplifiers with digital input, as also the memory and comparator stages 16, 17 and 18 as well as the current limiting stage 22.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:
1. An electric circuit arrangement, comprising
a driving motor means whose current input is at least nearly proportional to the moment of load,
power control means connected to said driving motor means,
current-regulating means connected to said power control means,
rotational speed regulating means, means for continuous pick-up of a magnitude proportional to the actual value of the moment of load, means for the continuous pick-up of a magnitude proportional to the actual value of the rotational speed, presetting means for predetermining the magnitude corresponding to the desired rotational speed value, first comparator means having an output connected to the input of the rotational speed regulating means and having connected as inputs the magnitudes for the desired rotational speed value and the actual rotational speed value, second comparator means, having connected as input the magnitudes for the desired rotational speed value and the actual rotational speed value, for producing a signal when the driving motor means reaches the predetermined desired rotational speed value, third comparator means having an output connected to the input of the current-regulating means and having connected as inputs the magnitude for the actual value of the moment of load and the output of the rotational speed regulating means, memory means having as inputs the magnitude for the actual value of the moment of load and the output of said second comparator means for storing the actual value of the moment of the load in response to the output of said second comparator means, and fourth comparator means having connected as inputs the actual value of the moment of load and the output of the memory means for producing a signal in the output thereof when the magnitude for the actual value of the moment of load exceeds the memory content of the memory means.

2. An electrical circuit arrangement according to claim 1, further comprising a current-limiting means connecting the actual value of the moment of load to the input of the memory means.

3. A circuit arrangement according to claim 1, further comprising current filtering means connecting the actual value of the moment of load to the input of the memory means to the first input of the fourth comparator means.

4. A circuit arrangement according to claim 1, including a current limit value indicator means connected to the output of said fourth comparator means for producing a warning signal in response to an output at said fourth comparator means.

5. A circuit arrangement according to claim 4, including a rotational speed limit value indicator means connected to the output of said second comparator means for producing an operating signal in response to an output at said second comparator means.

6. A circuit arrangement according to claim 1, including current limit means connected to the output of said fourth comparator means for producing a driving motor means current interrupt signal in response to an output of said fourth comparator means.

7. An electric circuit comprising:
a driving motor means whose current input is at least nearly proportional to the moment of load,
presetting means for predetermining the magnitude corresponding to a desired rotational speed value,
speed sensing means for sensing the actual rotational speed of said driving motor means,
moment sensing means for sensing the actual moment of load,
motor control means connected at said driving motor means, presetting means, speed sensing means and moment sensing means for controlling said motor means in response to signals from said presetting means, speed sensing means and moment sensing means,
speed comparator means connected to said presetting means and said speed sensing means for producing an operation signal when the driving motor means reaches the predetermined desired rotational speed value,
memory means connected to said moment sensing means and speed comparator means for storing the actual value of the moment of the load in response to an operational signal from said speed comparator means, and
moment comparator means connected to said memory means and said moment sensing means for producing an output signal when the magnitude of said actual value of the moment of load exceeds the value of the moment of load stored in said memory means.

* * * * *